UNITED STATES PATENT OFFICE.

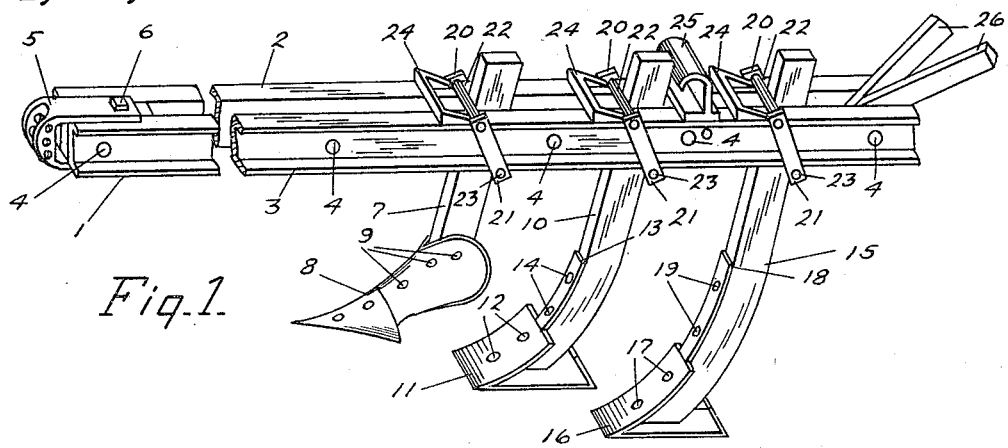
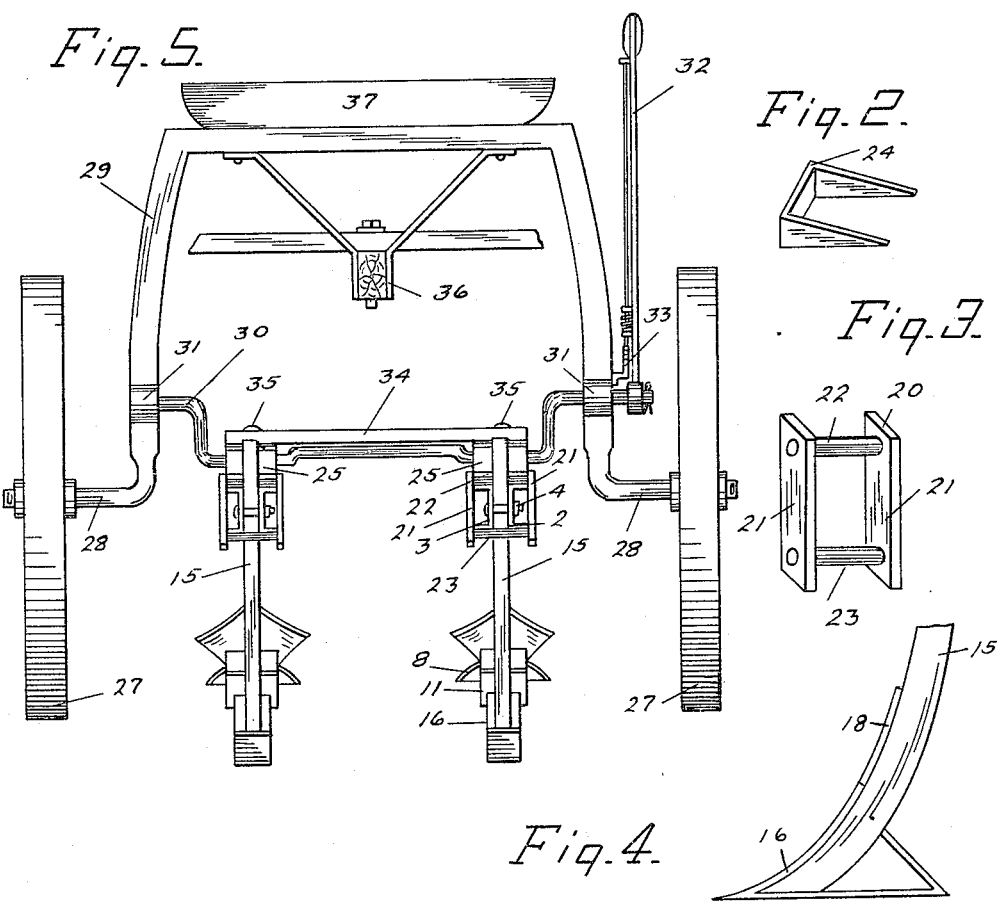

JOHN PLUMMER, OF JOHNSON, KANSAS.

PLOW.

1,145,212.  Specification of Letters Patent.  Patented July 6, 1915.

Application filed September 20, 1913. Serial No. 790,932.

*To all whom it may concern:*

Be it known that I, JOHN PLUMMER, a citizen of the United States, residing at Johnson, in the county of Stanton and State of Kansas, have invented a new and useful Improvement in Plows, of which the following is a specification.

My invention relates to plows, and particularly to plows which are adapted to the plowing of surface and sub-soils.

In semi-arid regions the surface soil and sub-soil become dry and hardened and moisture precipitated upon the surface of the land flows to lower levels and is quickly evaporated. Surface soil of virgin land is difficult to cultivate because of its hardened condition which prevents the moisture from percolating to the sub-soil, where it might be conserved to sustain plant life in the surface soil.

The objects of my invention are, first, to provide a cheap, durable and efficient plow operable by animal or other power and adapted for simultaneously plowing the surface soil and the sub-soil and to establish, between the furrows made by the plow, a crown or watershed of substantially convex surface to incline the moisture precipitated thereon to the adjacent furrows, second, to provide a plow having in advance a double check plow or lister to furrow the surface soil and one or more cutting plows in tandem with the lister to pulverize the sub-soil at the same time, and third, to provide an implement of this character with adjustments whereby the several plows combined in the one implement may be individually arranged to operate at variable levels and at variable angles.

I attain these objects by the means and mechanism illustrated in the accompanying drawing, in which:

Figure 1, is a perspective view of my invention. Fig. 2, is a perspective view of the U-shaped wedge, a part of my invention. Fig. 3, is a perspective view of the locking device, a part of my invention, and Fig. 4, is a side elevation of the cutting shoe 16, a part of my invention. Fig. 5, is a rear elevation of a plurality of plows attached to a vehicle.

Referring to the drawing: The numeral 1 indicates a plow beam which is preferably made of two similar channel plates 2 and 3, disposed back to back and clamped together by clamping bolts 4 which extend transversely through the channel plates at intervals. The channel plates are made of steel or iron, preferably mild steel. A clevis 5 having its front portions apertured at intervals in cross-wise direction is mounted upon the forward end of the plow beam and movably secured thereon by the pin 6 which extends through the end extremes of the clevis and between the channel plates rearwardly of the bolt 4 adjacent the forward end of the plow beam. The clevis provides means for attaching the plow to cross-trees, draw-bars and other devices for drawing the plow and the series of apertures in the forward end of the clevis provides means for elevating or depressing the end of the plow in the well known manner.

A shank 7 preferably of flat steel or iron of suitable length, width and thickness and having the lower end portion thereof bent forwardly in curved line is inserted upwardly between the channel plates 2 and 3 intermediate their length so that its upper end portion projects a distance above the plow beams. A two check plow or lister 8 carrying molding plates rearwardly is mounted on the lower end portion of the shank 7 and secured thereon by screw bolts 9 extending through the cheeks of the plow and piercing the shank. A shank 10, preferably of flat steel or iron of suitable width and thickness and having greater length than the shank 7 and having the lower end portion thereto bent forwardly in curved line is inserted upwardly between the channel plates 2 and 3 a distance rearwardly of the shank 7 so that its upper end portion projects a distance above the plow beam. A cutting shoe 11—preferably made of flat steel of suitable length, width and thickness is mounted on the lower end portion of the shank 10 and secured thereon by the screw bolts 12 and 12 which extend through the shoe and penetrate the shank. The cutting shoe is formed of a flat bar of steel which is bent to provide a straight bottom for the shoe, the rearward end portion being bent upwardly and inwardly so as to impinge upon and brace the rear edge of the shank, and the forward edge of the bar is bent upwardly and inwardly in curved line. The point of the shoe is tempered and ground to a sharp cutting edge.

The cutting shoe 11 is positioned a distance below the plane of the lister on shank 7 and for the purpose of cutting the subsoil below the surface soil displaced by the lister plow. The curved upper portion of the cutting shoe operates to wedge the subsoil cut by the shoe apart and reduce the same to small particles. A plate 13, preferably of flat steel of suitable thickness and length and having a width substantially the same as the thickness of the shank is mounted on the front edge of the shank so as to abut the end of the upper portion of the shoe for the purpose of preventing frictional wear and waste of the shank, and for the purpose of holding the shoe in place when the latter is under stress during the cutting process. The plate is secured on the shank by the screw-bolts 14 and 14 which are extended through the plate and penetrate the shank. A shank 15 similar to the shanks 7 and 10 but longer than the shank 10 and made of flat steel, is inserted upwardly between the channel plates 2 and 3, a distance rearwardly of the shank 10 so that its upper end portion projects a distance above the plow beam. A cutting shoe 16, preferably made of flat steel of suitable length, width and thickness is mounted on the lower end of the shank 15 and secured thereon by the screw-bolts 17 and 17 which extend through the front of the shoe and penetrate the shank. The cutting shoe is formed similar to the cutting shoe 11 on the shank 10 having a straight bottom portion and a curved upper portion but the width of the shoe is considerably less than the width of the shoe 11 for the reason that it operates below the plane of the shoe 11 and cuts the sub-soil at a greater depth and in consequence encounters greater resistance. A plate 18 is mounted on the front edge of the shank 15 so as to abut the end of the upper portion of the shoe 16 and is secured thereon by the screw-bolts 19 and 19 which extend through the plate and penetrate the shank. The cutting shoes 11 and 16 are designed for cutting layers of sub-soil and separating the portion cut away from the main body and the curved upper portion of the shoe is formed to turn the layer forwardly thereby breaking the same into small particles.

Although I have shown two cutting shoes in tandem with the lister plow it is considered that any number of additional cutting shoes may be carried by the plow if it be desired to cut the sub-soil into thinner layers to obtain less resistance in the cutting process.

For the purpose of holding the shanks 7, 10 and 15 in place, the channel plates 2 and 3 are drawn together by the bolts 4, the inner surface of the channel plates bearing against the opposite sides of the respective shanks thus preventing lateral movement of the shanks. To prevent horizontal movement of the shanks a locking device 20, comprising two similar oblong plates 21 and 21, extending diagonally across the outer faces of the channel plates 2 and 3 parallel to each other, the opposite end portions of the respective plates being connected by bolts 22 and 23, the former bearing upon the top of the channel plates and against the forward edge of the shank and the latter bearing against the bottom of the channel plates and against the rearward edge of the shank, is provided for each of the shanks, a U-shaped wedge 24, having a flat under surface and a tapering upper surface is movably positioned on the top of the channel plates 2 and 3 forwardly of each of the shanks 7, 10 and 15, so that the opposite limbs of the wedge are on opposite sides of the shank and beneath the bolt 22 of the locking device 20. The U-shaped wedge is for the purpose of providing means for adjusting the angle of inclination of the shank so as to elevate or depress the points of lister and the cutting shoes. The locking device 20 operates to prevent vertical and horizontal movement of the shanks when the stress of the plowing and cutting process is exerted against the shanks. A bearing box 25 is rigidly secured on the top of the channel plates 2 and 3 rearwardly adjacent the shank 10 and extends crosswise the channel plates. The forward part of the box adjacent to bottom is cut away transversely so as to admit of the entry of a crank shaft as will hereafter appear. A pair of handles 26 is attached to the back part of the plow beam for the purpose of guiding the implement when the same is drawn singly by animals or other power.

It is customary in plowing with a lister to furrow the surface soil at intervals and in parallel lines, and for the purpose of breaking a plurality of furrows at the same time the plow may be assembled in gangs of two or more and attached to a wheeled vehicle drawn by animals or by a traction engine. I show in Fig. 5 a vehicle of the well known type carrying two plows in parallelism, which vehicle consists of a pair of wheels 27 and 27, on axles 28 and 28, the latter combined with a vertical archway 29. A crank shaft 30 is journaled at its opposite ends in the bearing 31—31 on opposite sides of the archway a little distance above the axles. A lever 32, having a ratchet 33 is mounted on one end of the crank shaft for the purpose of elevating or depressing the plows carried by the crank shaft, the latter being mounted in the bearing box 25 on each plow. A bar 34 extending cross-wise the plows is attached to the opposite plows by its opposite ends and secured in place by the bolts 35 which extend through the bar and penetrate the adjacent plow-beam. A guiding tongue 36 is attached to the upper part of the arch-way adapted to engage the neck yoke of animals, not shown, or a similar contrivance on a traction engine, not shown. A seat 37 is mounted on the top of the archway, for the convenience of the operator.

Assuming that my invention is constructed and assembled as I have described, and it is desired to operate the same, the channel plates 2 and 3 are unclamped a distance and the shanks 7, 10 and 15 are moved vertically to bring the lister and the cutting shoes to lie in different planes so that the lister will furrow the surface soil and the cutting shoe 11 will cut and separate a layer of the sub-soil in the desired quantity, and the cutting shoe 16 will follow at a lower level and cut and separate an additional layer of sub-soil. The channel plates are then clamped together upon the shanks 7, 10 and 15 and the locking device 20 is forced forwardly or backwardly to give the proper inclination of the lister and cutting shoe points. The cross-tree attached to the harness of the animals, not shown, is then connected to the clevis 5, and the plow drawn forward. In the forward movement the lister on the shank 7 furrows the surface soil and transfers a part of the latter to each side of the furrow, the cutter shoe 11 on the shank 10 following directly after the lister at a lower level cuts a layer of the sub-soil and the wedge shaped shoe turns the layer upward and breaks the soil into small particles, the cutting shoe 16 on the shank 15 following directly after the cutting shoe 11 at a lower level cuts an additional layer of the sub-soil and its wedge shape operates to turn the layer upward and break it into small particles similar to the action of the shoe 11. The lister is designed to furrow the desired width of the soil to be tilled, the cutting shoe 11 cuts a layer of the sub-soil considerably narrower than the furrow, and the cutting shoe 16 cuts a layer of sub-soil narrower than that cut by the shoe 11, and thus the furrow is tilled in a tapering shape.

The surface soil between the furrows sheds the moisture to the furrows where it percolates to the bottom of the tilling and remains indefinitely to nourish and sustain the plant growing in the furrow.

If a plurality of plows are drawn by a traction engine the furrow is exactly similar to the furrow described when drawn singly by animals or other power, the results obtained differing only in the number of furrows tilled by the one operation.

With my invention, furrows may be tilled in the virgin soil of semi-arid lands and the moisture precipitated at intervals conserved within the furrows indefinitely. Seeds may be planted in season in the tilled furrows, and the moisture conserved will assure the germination and growth regardless of wind or other climatic condition, as the plow I have described will prepare a perfect seed bed from twelve to twenty-four inches and upward in depth.

Having described my invention, I claim—

In a plow, a standard having its foot bent forwardly in a curved line slidably secured between the divided portions of the beam and supportingly engaged by the inner sides of the sections thereof, and a cutting shoe mounted on the foot of said standard, said cutting shoe consisting of a flat bar of metal having its forward end portion bent upwardly and inwardly in curved line and secured on the front of the foot of the standard and the opposite end portion thereof bent upwardly and inwardly in straight line and the terminal end thereof contacting the back of the foot of said standard, the toe portion of said shoe being hardened and sharpened transversely to form a blade.

JOHN PLUMMER.

Witnesses:
  A. L. DONOHUE,
  T. FARRON.

Copies of this patent may be obtained for five cents each, by addressing the "Commissioner of Patents, Washington, D. C."